(12) United States Patent
Kim

(10) Patent No.: US 6,463,208 B1
(45) Date of Patent: Oct. 8, 2002

(54) OPTICAL DISC REPRODUCING APPARATUS AND METHOD

(75) Inventor: Young-Chul Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 08/996,346

(22) Filed: Dec. 22, 1997

(30) Foreign Application Priority Data

Dec. 28, 1996 (KR) .............................................. 96-74756

(51) Int. Cl.[7] .............................................. H04N 5/781
(52) U.S. Cl. .......................... 386/124; 386/126; 360/32
(58) Field of Search .............................. 386/45, 33, 95, 386/98, 111–112, 125–126, 124; 348/419; H04N 5/76, 5/92, 9/79

(56) References Cited

U.S. PATENT DOCUMENTS

| 5,758,011 A | * | 5/1998 | Fujinami | ..................... 386/111 |
| 5,920,529 A | * | 7/1999 | Ota et al. | ..................... 386/126 |
| 6,009,231 A | * | 12/1999 | Aoki et al. | ..................... 386/68 |
| 6,064,795 A | * | 5/2000 | Uchide | ..................... 386/111 |
| 6,069,993 A | * | 5/2000 | Kawara | ..................... 386/68 |
| 6,081,651 A | * | 6/2000 | Kim | ..................... 386/111 |

* cited by examiner

*Primary Examiner*—Thai Tran
(74) *Attorney, Agent, or Firm*—Birch, Stewart, Kolasch & Birch, LLP

(57) ABSTRACT

The optical disk reproducing apparatus and method reproduce data from an optical disk, and an error correction circuit included therein error corrects the reproduced data in data blocks of predetermined size to produce error corrected data. The error correction circuit selectively adds dummy data to the reproduced data to form the data blocks. System data is then separated from the error corrected data, and the transfer of the error corrected data to a memory is controlled based on the system data such that the dummy data in the error corrected data is not transferred to the memory.

24 Claims, 8 Drawing Sheets

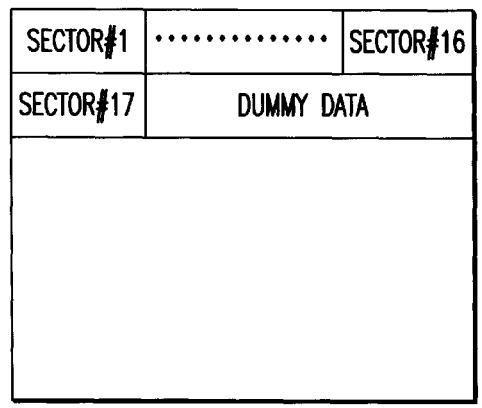
FIG.3A
PRIOR ART
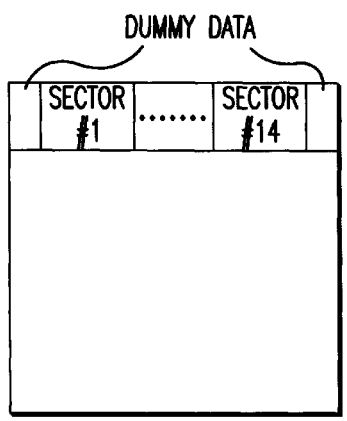 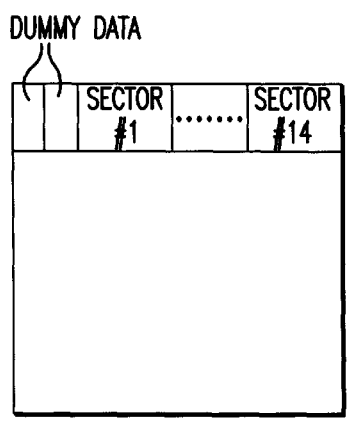 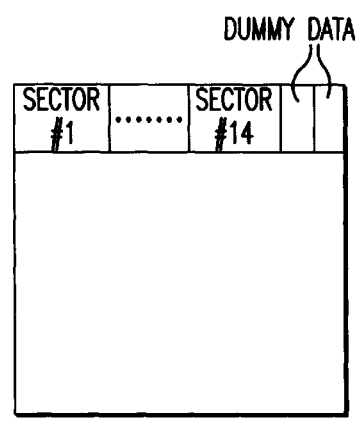
FIG.3B
PRIOR ART
FIG.3C
PRIOR ART
FIG.3D
PRIOR ART

OPTICAL DISC REPRODUCING APPARATUS AND METHOD

BACKGROUND OF THE INVENTION

1. Field of the Invention

The present invention relates to an optical disc reproducing apparatus and method using a variable transfer rate buffer to provide seamless play, and more particularly, to an optical disc reproducing apparatus which reduces the amount of information temporarily stored by the variable transfer rate buffer.

2. Description of Related Art

A greater demand exits in the industry for techniques which allow large amounts of information to be densely recorded upon recording media. Development has focused on recording media such as compact discs, digital video discs (DVD), etc., to meet this need.

A DVD reproducing apparatus has been designed to reproduce data recorded on a DVD (diameter:12 cm, thickness:1.2 mm) for about 135 minutes, and to provide better image and sound quality than a laser disc. Accordingly, a DVD device is one of the noticeable multi-media devices in audio/video and computer applications. DVDs are widely used in image processing applications due to their large storage capacity. One of the DVD system formats has system specifications as follows:

1. Maximum 9 camera angles reproducible;
2. Maximum 8 channels for audio and 32 languages as a caption;
3. Storage of a plurality of user selectable programs, selectable via a menu screen; and
4. Provision of parental lock function which can prevent children from watching adult programs.

According to the above system specification, the structure of the data stream used in DVDs includes video data, audio data, sub-picture data, and control data. The control data is used during reproduction to control the reproducing operation. The sub-picture stream includes, for example, caption data to be displayed on a display screen during reproduction.

As shown in FIG. 2A, one DVD format includes more than one program (title), represented by program chain data (PGCI), and each program is divided into a plurality of cells. As shown in FIG. 2B, each cell is divided into an integer number of video object unit(s) or VOBU(s). A VOBU is a basic unit of data for transfer. Each VOBU includes sectors which each store a predetermined range of video/audio data. As shown in FIG. 2C, the sector includes header data and main data (e.g., video/audio data). A VOBU consisting of a plurality of sectors stores a definite range of video/audio data in accordance with the system specification. Because the quantities of video/audio data included in the definite range of each VOBU are different from each other, the length of VOBUs varies and the number of sectors in VOBUs varies.

The programs, cells, VOBUs, and sectors include navigation data (system control data), i.e., header data. The header data includes position data. For instance, the header data for the sectors in a VOBU includes sequentially increasing identifiers (IDs), and the header data for a VOBU indicates the IDs for the first and last sector in the VOBU.

A conventional optical disc reproducing apparatus using the above-described data stream structure will be described with reference to FIG. 1. As shown in FIG. 1, the optical disc reproducing apparatus for reproducing data from an optical disc 1 includes a motor 11 for rotating the optical disc 1; an optical pick-up 3 for reading the data recorded on the optical disc 1; a servo circuit 13 for generating drive signals to control the operation of the motor 11 and the optical pick-up 3; and a microprocessor 15 for controlling the operation of the servo circuit 13, a signal processing circuit 5, an error correction circuit 7, and a navigator 17 based on key input from a user.

In accordance with the instructions received from the microprocessor 15, the signal processing circuit 5 amplifies the reproduced signal output from the optical pick-up 3, and performs phase compensation thereon. The microprocessor 15 also obtains management and sub-management data from the reproduced signal processed by the signal processing circuit 5. The management data includes table of contents (TOC) data such as recorded in the lead-in area of the optical disk 1. The sub-management data includes characteristic information for the data recorded on the optical disk such as recorded in the headers of logically grouped data. With respect to a DVD, the characteristic information could indicate which camera angle from the plurality of camera angles the data in the following logical group represents, or could indicate that the data in the following logical group is English language caption data.

The error correction circuit 7 corrects, under the control of the microprocessor 15, errors in the bit stream of the reproduced signal output by the signal processing circuit 5. A variable transfer rate (VBR) buffer 9 temporarily stores the error corrected reproduced signal. The navigator 17 controls the transfer of data from the VBR buffer 9 to a dummy data removing section 33 in part based on control signals from the microprocessor 15 and in part based on the control data extracted from the bit stream of the reproduction signal output from the dummy data removing section 33.

The dummy data removing section 33 removes dummy data added to the processed reproduced data during the error correction process. The dummy data removing section 33 transfers system data in the error corrected data, free of dummy data, to the navigator 17, and transfers the reproduction data in the error corrected data, free of dummy data, to the data decoding section 30 under the control of the navigator 17.

As shown in FIG. 1, the data decoding section 30 includes a video decoding part 21, a graphics circuit 24, and an audio decoding part 27 operating under the control of the navigator 17. The graphics circuit 24 receives the output of the VBR buffer 9 via the video decoding part 21, and the audio decoding part 27 receives the output of the VBR buffer 9 via the graphics circuit 24 and the video decoding part 21.

A mixer 43 mixes the output of the video decoding part 21 and the graphics circuit 24 to produce a digital video signal. A first digital/analog converter 23 digital-to-analog converts the digital video signal, while a second digital/analog converter 29 digital-to-analog converts the output of the audio decoding part 27. An NTSC/PAL encoder 31 converts the analog video signal output from the first digital/analog converter 23 into either the NTSC or PAL signal format.

Next, the operation of the conventional optical disc reproducing apparatus will be described. After mounting the optical disc 1 on a turntable (not shown), the user selects a specific system function and options associated therewith using a plurality of input keys (not shown). For instance after selecting a basic reproduction operation, the user can select the reproduction characteristics. The reproduction characteristics include, for example, the camera angle to be reproduced, that a caption should be displayed, and the language of the caption. If the user does not elect to select the reproduction characteristics, then the basic reproduction operation will proceed according to predetermined default reproduction characteristics.

When the user selects a reproduction operation, the microprocessor 15 controls the servo circuit 13 to drive the motor 11 and the optical pick-up 3. According to the drive signals from the servo circuit 13, the optical pick-up 3 reproduces data recorded on the optical disc 1. The reproduced data is converted into an electrical signal and output to the signal processing circuit 5. The signal processing circuit 5 performs a predetermined signal processing operation such as amplification, phase compensation, etc., on the electrical signal (i.e., the reproduced signal) in accordance with the instructions received from the microprocessor 15, and the microprocessors 15 extracts the management and sub-management data from the processed reproduced signal.

The processed reproduced signal is output to the error correction circuit 7 as shown in FIG. 1. The error correction circuit 7 corrects errors generated in the reproduced signal in a predetermined manner as instructed by the microprocessor 15. Specifically, the error correction circuit 7 performs error correction on the processed reproduced data in blocks of sixteen sectors. However, if less than sixteen sectors remain in a VOBU undergoing error correction, the error correction circuit 7 add sectors of dummy data to the sectors of the VOBU to form a sixteen sector block for error correction such as shown in FIGS. 3A–3D.

If seventeen sectors remain in a VOBU, then the error correction circuit 7 forms a sixteen sector block and adds 15 sectors of dummy data to the remaining sector to form another sixteen sector block as shown in FIG. 3A. If fourteen sectors remain in a VOBU the error correction circuit adds one sector of dummy data to the beginning and end of the fourteen sectors to form a sixteen sector block as in FIG. 3B, adds two dummy data sectors to the beginning of the fourteen sectors as shown in FIG. 3C, or adds two dummy data sectors to the end of the fourteen sectors as shown in FIG. 3D.

As part of the header data of each dummy data sector, the error correction circuit 7 sets an ID which is not (1) greater than or equal to the ID for the first sector of the VOBU undergoing error correction and (2) less than or equal to the ID for the last sector of the VOBU undergoing error correction.

The error corrected reproduced signal is then output to and temporarily stored by the VBR buffer 9. Based on the reproduction characteristics and the management and sub-management data, the navigator 17 controls the transfer of data from the VBR buffer 9 to the dummy data removing section 33. Because frames of video data are compressed to different sizes according to the characteristics of the images in the frame, the quantity of data input by the VBR buffer 9 varies. In a DVD, data for up to nine camera angles can be stored, and the data corresponding to each camera angle is not sequentially stored. To reproduce a desired camera angle, the microprocessor 15, based on the management and sub-management data, causes the optical pick-up 3 to jump from location to location on the optical disk 1 where the data for the desired camera angle is stored to reproduce this data in the proper sequence. Consequently, the desired reproduction characteristics also cause the quantity of data input to the VBR buffer 9 to vary. In order to store variably transferred data, yet output a continuous and seamless stream of, for example, video data, the VBR buffer 9 with a large storage capacity is used.

The VBR buffer 9 transfers data to the dummy data removing section 33 under the control of the navigator 17.

The operation of the dummy data removing section 33 will now be described. The navigator 17 detects the position data in the header data of a VOBU stored in the VBR buffer 9. Namely, the navigator 17 decodes, from the header data of the VOBU, the ID for the first sector of the VOBU and the ID for the last sector of the VOBU. Then, the navigator 17 transfers this VOBU position data to the dummy data removing section 33. For each sector transferred to the dummy data removing section 33, the dummy data removing section 33 determines whether the ID of the transferred sector is greater than or equal to the ID for the first sector of the VOBU and less than or equal to the ID for the last sector of the VOBU. If the ID for the transferred sector falls within the range of the position data, then the dummy data removing section 33 outputs the sector to the data decoding section 30. If the ID of the transferred sector does not fall within the range of the position data, then the dummy data removing section 33 does not output the sector to the data decoding section 30.

The dummy data removing section 33 performs this operation for each sector transferred from the VBR buffer 9. When the sectors for a new VOBU are being transferred from the VBR buffer 9 to the dummy data removing section 33, the navigator 17 after detecting position data in the header data of this new VOBU, transfers the new position data to the dummy data removing section 33, and the dummy data removing section 33 performs the above operation based on this new position data. In this manner, the dummy data sectors are removed prior to transfer to the data decoding section 30.

The data output from the dummy data removing section 33 includes system related control data, video data, sub-picture data, (e.g., caption and menu selection data), and audio data. The navigator 17 extracts the control data, and controls the operation of the data decoding section 30 based in part thereon.

As shown in FIG. 1, the data output from the dummy data removing section 33 is received by the video decoding part 21 of the data decoding section 30. The video decoding part 21 extracts, decompresses, and decodes the video data in the bit stream output from the dummy data removing section 33 under the control of the navigator 17. The video decoding part 21 then outputs the processed video data to the mixer 43. The video decoding part 21 also passes the bit stream from the dummy data removing section 33 to the graphics circuit 24.

The graphics circuit 24 extracts and decodes the sub-picture data in the bit stream from the dummy data removing section 33, generates character data based on the decoded sub-picture data, and outputs the character data to the mixer 43.

The mixer 43 mixes the processed video data output by the video decoding part 21 with the character data to produce a digital video signal. The first digital/analog converter 23 converts the digital video signal output by the mixer 43 into an analog video signal. The NTSC/PAL encoder 31 converts the analog video signal into either the NISC or the PAL video signal format to produce an output video signal. The bit stream output by the dummy data removing section 33 is transferred from the video decoding part 21 and the graphics circuit 24 to the audio decoding part 27. Based on instructions from the navigator 17, the audio decoding part 27 extracts and decodes the audio data in this bit stream. The second analog converter 29 converts the audio data into an output audio signal.

Accordingly, in the conventional optical disk reproducing apparatus, the VBR buffer 9 must have a large capacity because all of the dummy data sectors included therein in the error corrected reproduced signal. Such a large VBR buffer increases the cost of the conventional optical disk reproduced apparatus.

SUMMARY OF THE INVENTION

One object of the present invention is to provide an optical disc reproducing apparatus and method which overcome the problems and disadvantages discussed above with respect to the conventional art.

Another object of the present invention is to provide an optical disc reproducing apparatus and method which use a VBR buffer having a much smaller storage capacity than in the conventional art.

These and other objects are achieved by providing an optical disk reproducing apparatus, comprising: a memory; reproducing means for reproducing data from an optical disk; an error correction circuit error correcting said reproduced data in data blocks of predetermined size to produce error corrected data, said error correction circuit selectively adding dummy data to said reproduced data to form said data blocks; and control means for separating system data from said error corrected data, and for controlling transfer of said error corrected data to said memory based on said system data such that said dummy data in said error corrected data is not transferred to said memory.

These and other objects are further achieved by providing a method of reproducing data from an optical disk, comprising: reproducing data from an optical disk; forming data blocks of predetermined size by selectively adding dummy data to said reproduced data; error correcting said data blocks to produce error corrected data; separating system data from said error corrected data; and controlling transfer of said error corrected data to a memory based on said system data such that said dummy data in said error corrected data is not transferred to said memory.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3A–3D illustrate various formations of sixteen sector blocks for error correction;

DETAILED DESCRIPTION OF THE PREFERRED EMBODIMENTS

Figure 1:
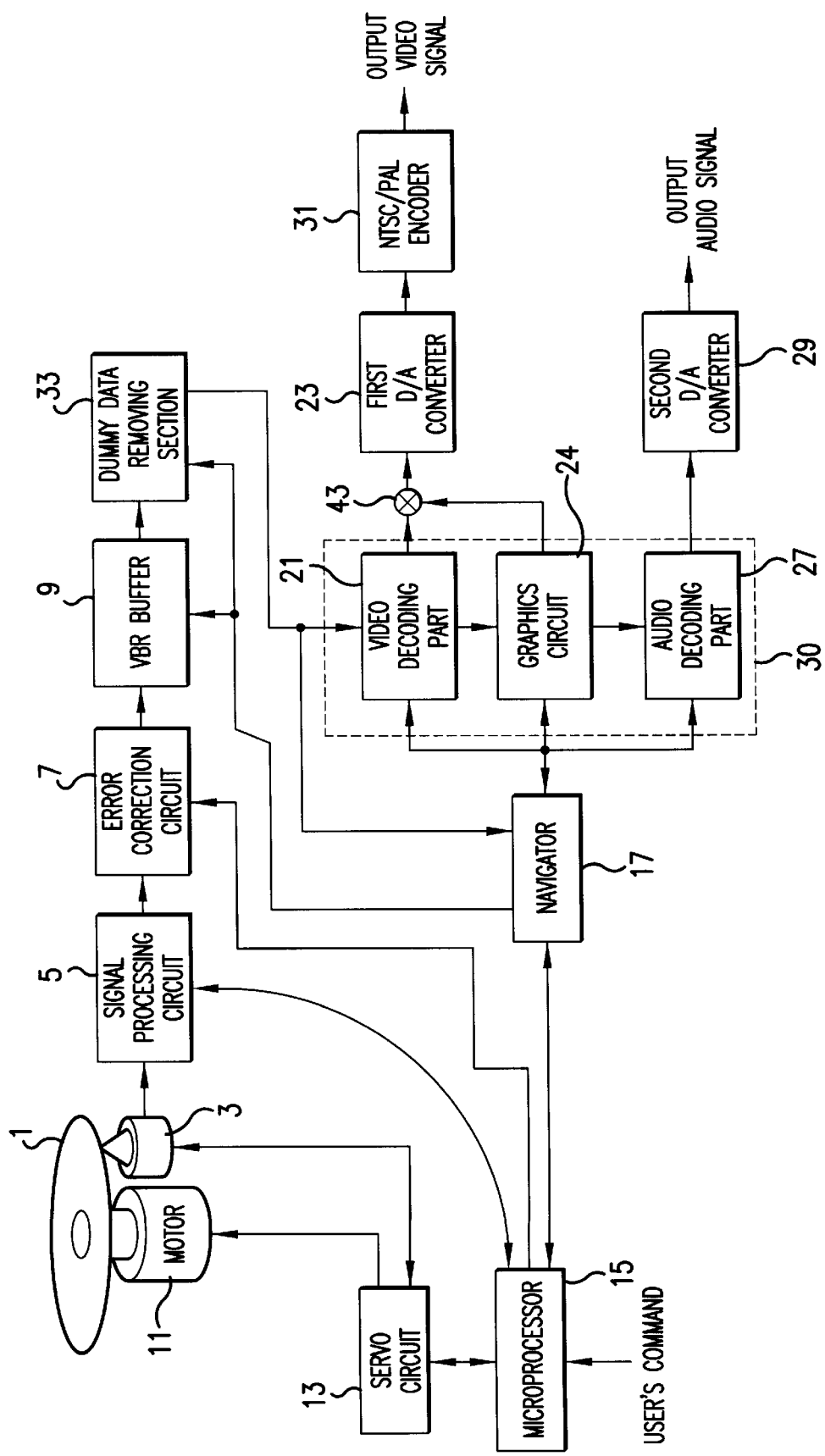
FIG. 1 illustrates a conventional optical disk reproducing apparatus
Figures 2A, 2B, 2C:
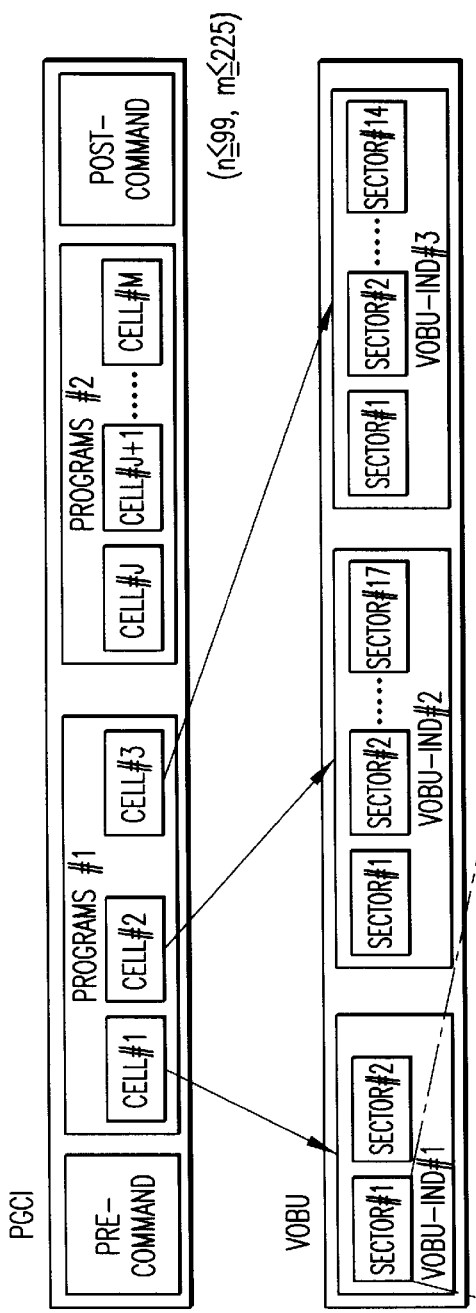
FIGS. 2A–2C illustrate the data structure of a DVD.
Figure 4:
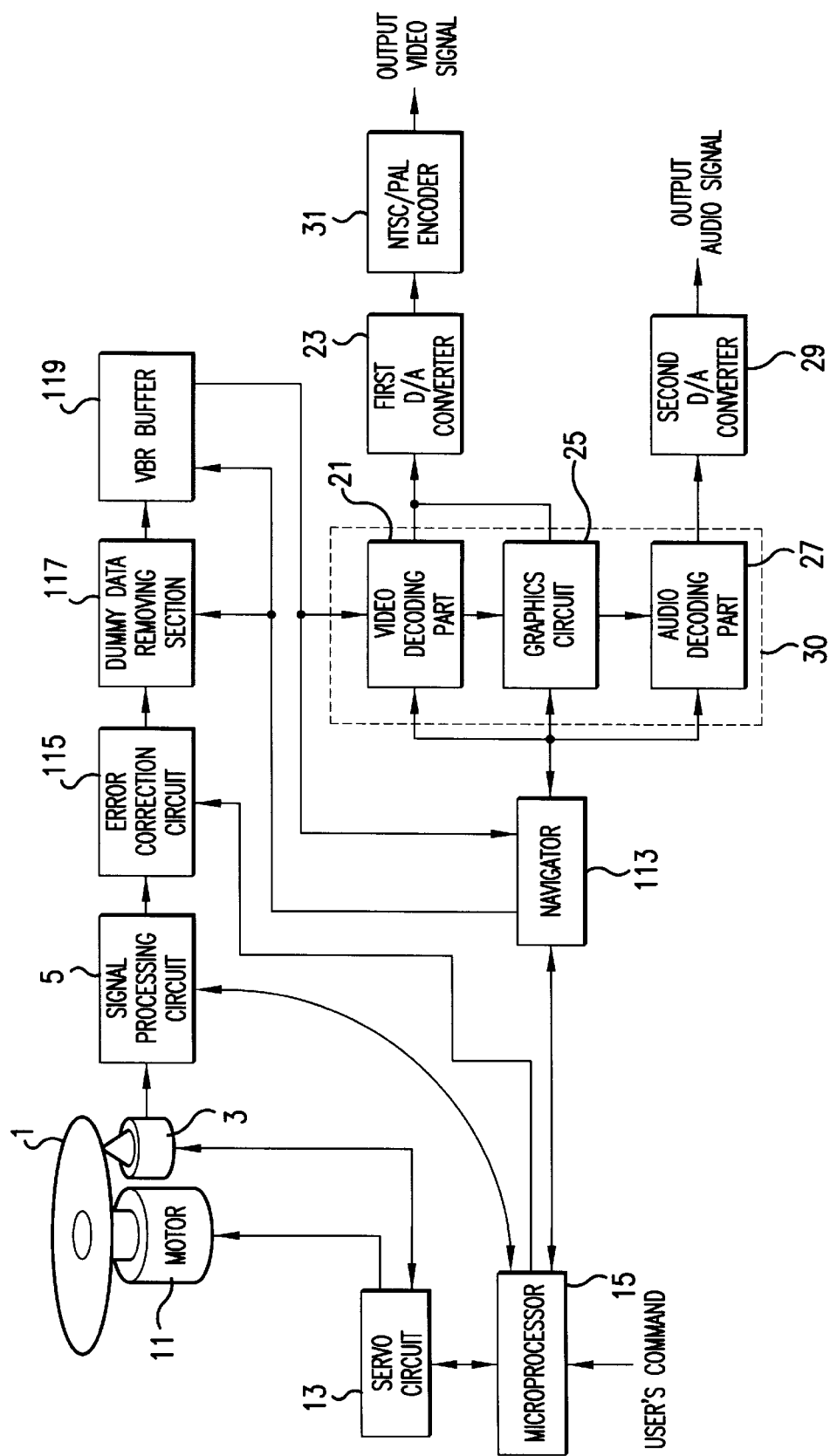
FIG. 4 illustrates an optical reproducing apparatus according to the present invention.

As shown in FIG. 4, the optical disc reproducing apparatus according to one embodiment of the present invention is the same as the conventional optical disc apparatus shown in FIG. 1 except that the error correction circuit 7, VBR buffer 9, dummy data removing section 33, and navigator 17 have been replaced by an error correction circuit 115, a dummy data removing section 117, a VBR buffer 119, and a navigator 113. In view of the foregoing, only the differences between the present invention and the conventional art will be discussed.

As shown in FIG. 4, the error correction circuit 115 receives the output of the signal processing circuit 5, and outputs the error corrected reproduced data to the dummy data removing section 117. The dummy data removing section 117, under the control of the navigator 113, removes the dummy data sectors from the error corrected reproduced data, and transfers the error corrected reproduced data without the dummy data sectors to the VBR buffer 119. The navigator 113 also controls the transfer of data from the VBR buffer 119 to the data decoding section 30 in part based on control signals from the microprocessor 15 and in part based on the control data extracted from the bit stream of the reproduction signal output from the VBR buffer 119.

Figure 5:
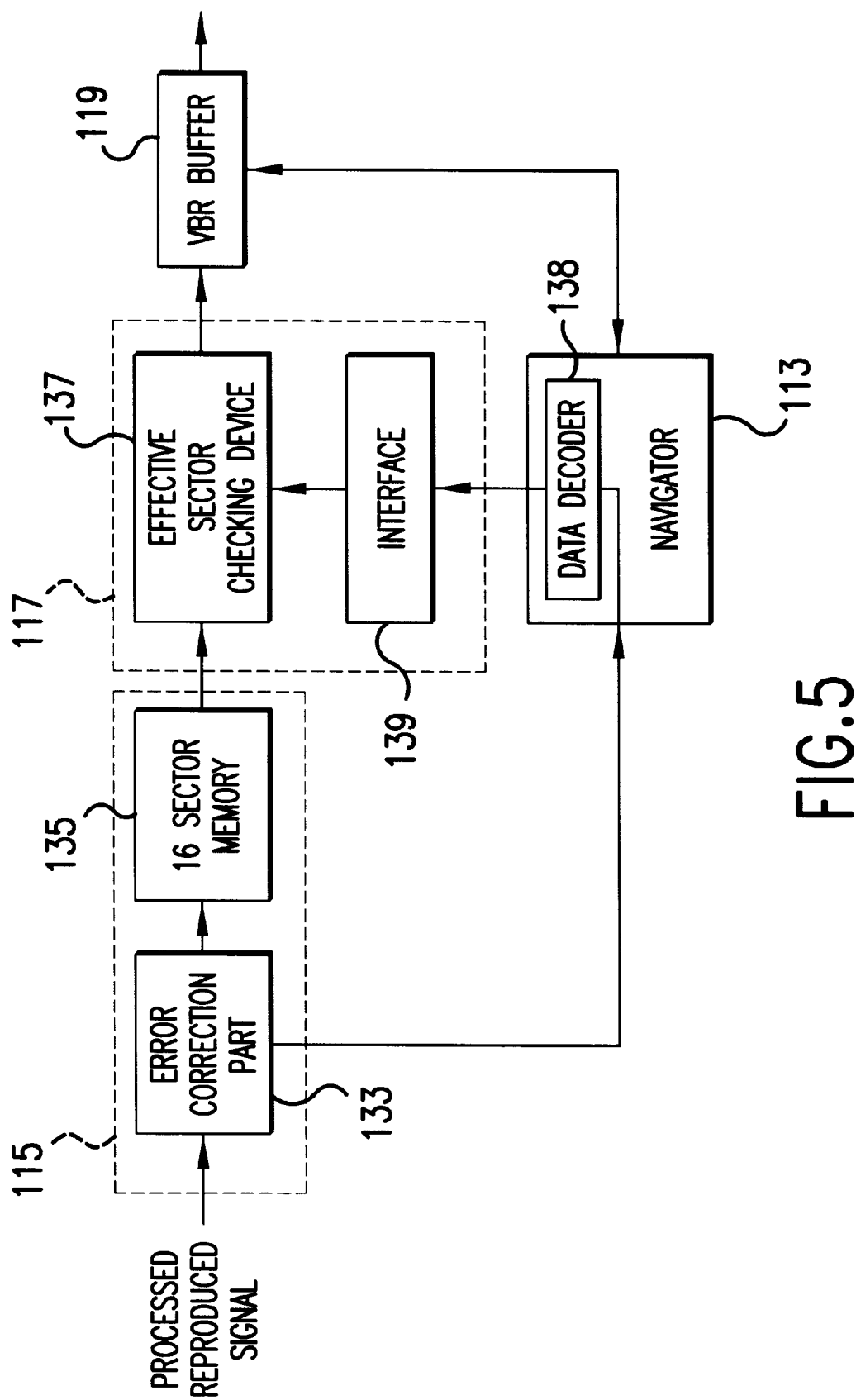
FIG. 5 illustrates the error correction circuit, dummy data removing circuit, and navigator in the embodiment of FIG. 4 in greater detail.

As shown in FIG. 5, the error correction circuit 115 includes an error correction part 133 and a sixteen sector memory 135. The processed reproduced signal output from the signal processing circuit 5 undergoes error correction performed by the error correction part 133. In performing this error correction, the error correction part 133 forms sixteen sector blocks in the same manner as discussed with respect to the conventional error correction circuit 7. Each error corrected sixteen sector block is then stored in the sixteen sector memory 135. Preferably, the storage capacity of the sixteen sector memory 135 is sixteen sectors.

Also as shown in FIG. 5, the error corrected reproduced signal is sent to the navigator 113. A data decoder 138 in the navigator 113 decodes header data in the error corrected reproduced signal, and transfers the decoded header data to the dummy data removing section 117.

The dummy data removing section 117 includes an effective sector checking device 137 and interface 139 as shown in FIG. 5. The interface 139 receives the decoded header data, and transfers the decoded header data to the effective sector checking device 137. Based on the decoded header data, the effective sector checking device 137 prevents the dummy data sectors stored in the sixteen sector memory 135 from being transferred to the VBR buffer 119. The VBR buffer 119 stores the sectors transferred thereto from the effective sector checking device 137. Because the dummy data sectors have already been removed when the VBR buffer 119 stores the error corrected reproduced signal, the VBR buffer 119 can have a significantly smaller storage capacity than the VBR buffer in the conventional art.

Next, the operation of the optical disk reproducing apparatus will be discussed with respect to FIG. 5. When the processed reproduced signal is received by the error correction part 133, the error correction part 133 forms sixteen sector blocks using dummy data sectors, and performs error correction thereon in the same manner as discussed above with respect to the error correction circuit 7. Each sixteen sector error corrected block is then stored in the sixteen sector memory 135. The error corrected reproduced signal is also sent to the navigator 113.

The data decoder 138 in the navigator 113 detects and decodes the header data for each VOBU to obtain the position data for the VOBU; namely, the ID of the first sector and the ID of the last sector in the VOBU. The data decoder 138 then outputs this position data to the interface 139, and the interface 139 transfers the position data to the effective sector checking device 137.

The effective sector checking device 137 uses the position data transferred thereto by the data decoder 138 as reference data. The effective sector checking device 137 compares the sector ID for each sector read from the sixteen sector memory 135 to the position data. If the sector ID of a sector being checked is (1) greater than or equal to the ID for the first sector in the VOBU and (2) less than or equal to the ID for the last sector in the VOBU, the effective sector checking device 137 transfers that sector to the VBR buffer 119. If, however, the ID of the sector being checked does not fall within the range of the position data, then the effective sector checking device 137 does not transfer this sector to the VBR buffer 119. Instead, this sector is identified as a dummy data sector. Because the dummy data sectors are not transferred to the VBR buffer 119, the dummy data sectors will eventually be over-written by the error correction part 133 as the error correction part 133 stores new sixteen sector blocks of error corrected data in the sixteen sector memory 135. Also, because dummy data sectors are not being transferred to the VBR buffer 119, the storage capacity of the VBR buffer 119 can be significantly reduced compared to that of the conventional art.

Figure 6:
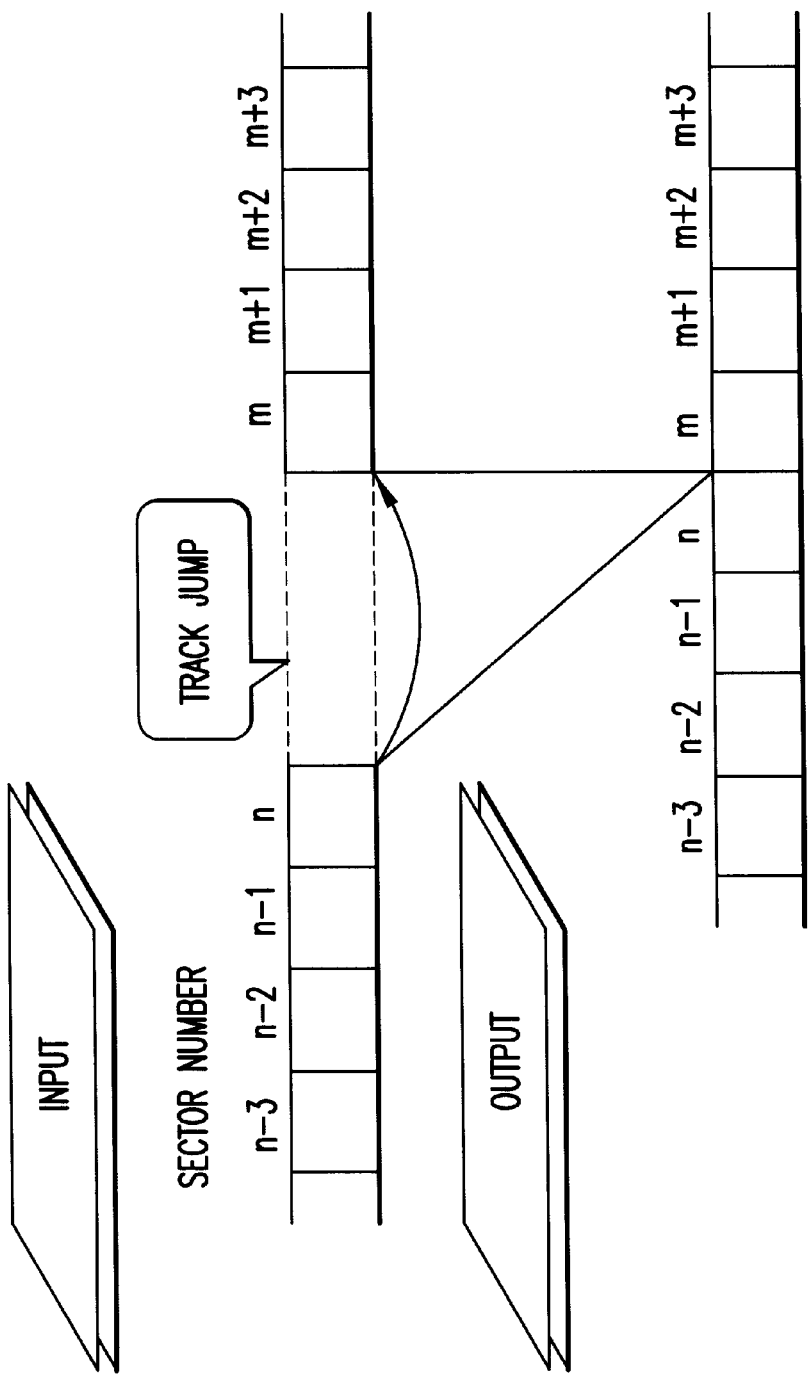
FIG. 6 illustrates an example of seamless play.

Each sixteen sector block stored in the sixteen sector memory 135 belongs to only one VOBU. When performing seamless play and a track jump is made from sector n of one VOBU to sector m of another VOBU such as shown in FIG. 6, the error correction part 133 forms a sixteen sector block which includes the sector n, and forms a separate sixteen sector block which includes the sector m. When a new VOBU is reproduced, the data decoder 138 detects and decodes the header data for the new VOBU such that, after the effective sector checking device 137 has completed checking the sectors in the sixteen sector blocks for one VOBU, the effective sector checking device 137 begins checking the sixteen sector blocks for the new VOBU using the position data for the new VOBU provided by the data decoder 138. Accordingly, the sectors output to the VBR buffer 119 are as shown in FIG. 6; namely, sector m is output after sector n.

Figure 7:
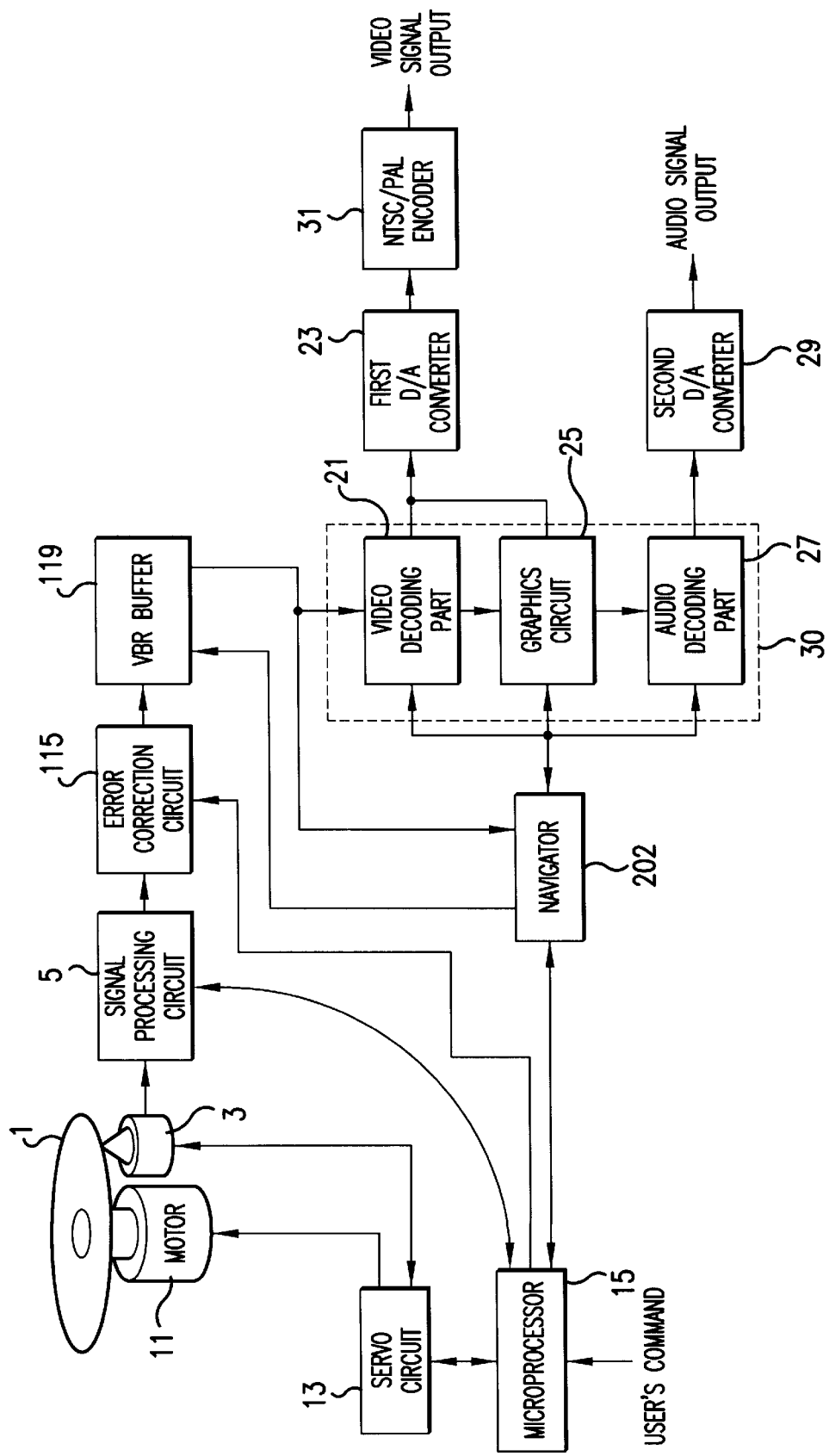
FIG. 7 illustrates another embodiment of the optical disk reproducing apparatus according to the present invention.

FIG. 7 illustrates a second embodiment of the optical disk reproducing apparatus according to the present invention. As shown in FIG. 7, the optical disk reproducing apparatus according to this second embodiment is the same as the first embodiment except that the dummy data removing section 117 has been eliminated, and the navigator 113 has been replaced by navigator 202. In view of the foregoing, only the differences between the second embodiment and the first embodiment of the present invention will be discussed.

Figure 8:
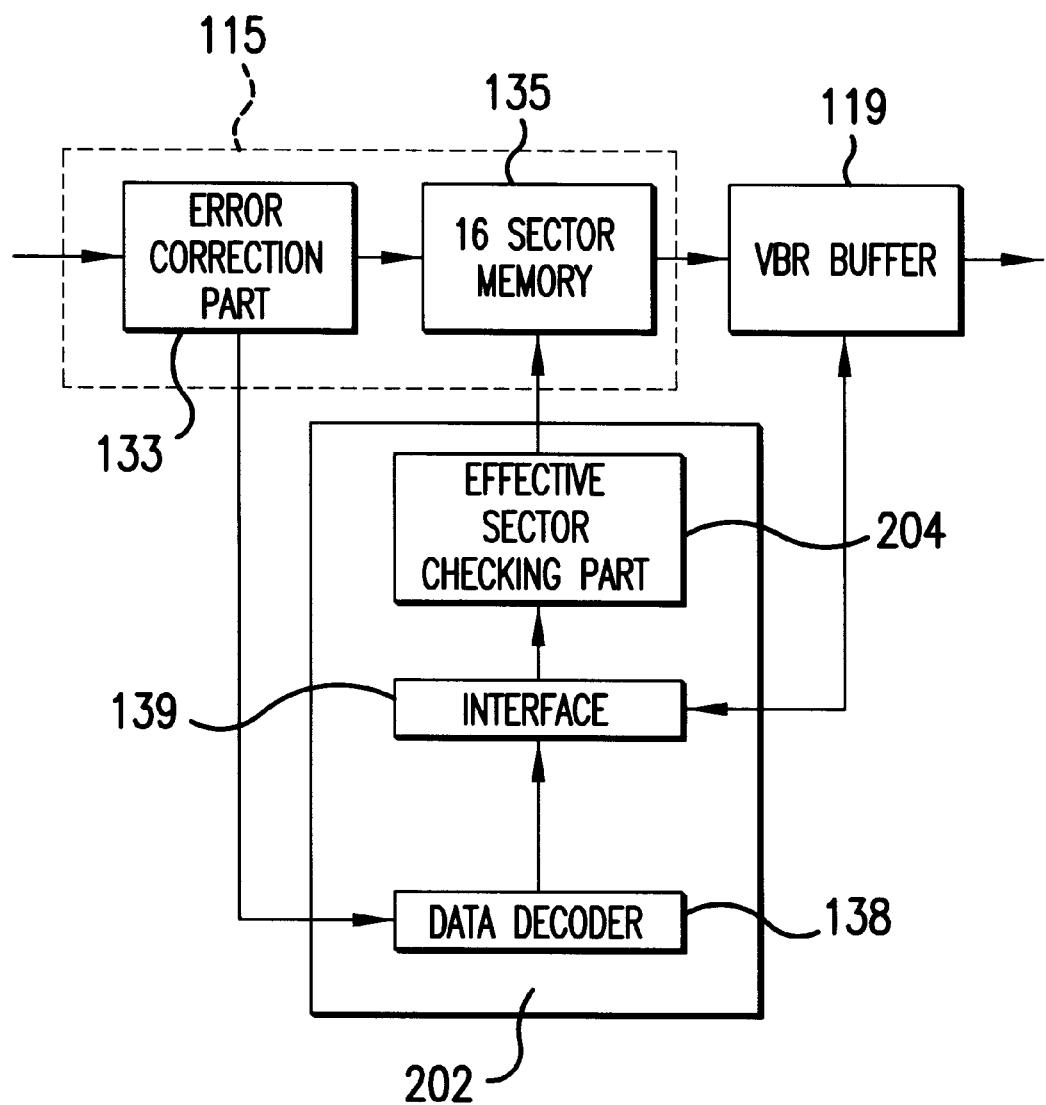
FIG. 8 illustrates the error correction circuit and navigator in the embodiment of FIG. 4 in greater detail.

FIG. 8 illustrates the error correction circuit 115, the navigator 202, and the VBR buffer 119 in greater detail. As shown in FIG. 8, the navigator 202 includes the data decoder 138 which receives the error corrected reproduced signal from the error correction part 133. The navigator 202 also includes the interface 139 which receives the decoded header data from the data decoder 138 and the control data stored in the VBR buffer 119. The navigator 202 further includes an effective sector checking part 204 which receives the decoded header data from the interface 139. The effective sector checking part 204 controls whether the sixteen sector memory 135 of the error correction circuit 115 outputs a given sector to the VBR buffer 119.

Next, the operation of the optical disk reproducing apparatus according to the second embodiment of the present invention will be described with respect to the FIG. 8. The error correction part 133 of the error correction circuit 115 forms sixteen sector blocks from the processed reproduced signal using dummy data sectors if necessary, performs error correction thereon, and stores the error corrected sixteen sector blocks in the sixteen sector memory 135. The error correction part 133 also outputs the error corrected reproduced signal to the data decoder 138.

As described previously, the data decoder 138 decodes the header data of each VOBU to determine the position data therefor. The interface 139 transfers the position data to the effective sector checking part 204. The interface 139 also acts as an interface for receiving control data in the processed reproduced signal stored in the VBR buffer 119, and transfers control signals from the navigator 202 to the VBR buffer 119 to control the transfer of data out of the VBR buffer 119.

The effective sector checking part 204 determines whether a sector stored in the sixteen sector memory is a dummy data sector or not in the same manner as described above with respect to the operation of the effective sector checking part 137. If a sector is determined as a dummy data sector, then the effective sector checking part 204 prevents the sixteen sector memory from transferring that sector to the VBR buffer 119. If, however, the sector being tested is not determined to be a dummy data sector, then the effective sector checking part 204 causes the sixteen sector memory 135 to output that sector to the VBR buffer 119. The dummy data sectors not output to the VBR buffer 119 are eventually over-written by the error correction part 133.

As with the first embodiment of the present invention, the second embodiment of the present invention prevents dummy data sectors from being stored by the VBR buffer 119, and thus allows a VBR buffer with a significantly smaller storage capacity to be used in the optical disk reproducing apparatus according to the present invention. This also reduces the cost of the optical disk reproducing apparatus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. An optical disk reproducing apparatus, comprising:
   a memory;
   reproducing means for reproducing data from an optical disk;
   an error correction circuit error correcting said reproduced data in data blocks of predetermined size to produce error corrected data, said error correction circuit selectively adding dummy data to said reproduced data to form said data blocks; and
   control means for separating system data from said error corrected data, and for controlling transfer of said error corrected data to said memory based on said system data such that said dummy data in said error corrected data is not transferred to said memory.

2. The apparatus of claim 1, wherein said error correction circuit comprises:

temporary storage means for temporarily storing said error correction data.

3. The apparatus of claim 2, wherein said temporary storage means stores said error correction data as said data blocks.

4. The apparatus of claim 3, wherein said predetermined size is sixteen sectors of data.

5. The apparatus of claim 1, wherein said system data includes position data.

6. The apparatus of claim 5, wherein said reproducing means reproduces data divided into logical data groups, each logical data group divided into data units, said logical data groups and said data units include position data, said position data for each logical group includes identifiers for first and last data units in said logical data group, and said position data for each data unit includes an identifier.

7. The apparatus of claim 6, wherein said logical data group is a video object unit, and said data unit is a sector.

8. The apparatus of claim 1, wherein said reproducing means reproduces data divided into logical data groups, each logical data group divided into data units, and said logical data groups and said data units include position data;

said error correction circuit, for each logical data group, forms said data blocks of a predetermined number of data units and selectively adds data units of said dummy data to form said data blocks; and said control means includes, a data decoder detecting and decoding said position data for a logical data group in said error corrected data, and a checking device for comparing said position data for each data unit in each data block corresponding to said logical data group to said decoded position data for said logic data group, determining whether each data unit is a dummy data unit based on said comparison, and controlling transfer of each data unit to said memory based on said determination such that said dummy data is not transferred to said memory.

9. The apparatus of claim 8, wherein said position data for said logical group includes identifiers for first and last data units in said logical data group, and said position data for each data unit includes an identifier.

10. The apparatus of claim 9, wherein said logical data group is a video object unit, and said data unit is a sector.

11. The apparatus of claim 8, wherein said logical data group is a video object unit, and said data unit is a sector.

12. The apparatus of claim 1, further comprising:

a data decoder; and said control means controls transfer of said error corrected data stored in said memory to said data decoder.

13. A method of reproducing data from an optical disk, comprising:

reproducing data from an optical disk;

forming data blocks of predetermined size by selectively adding dummy data to said reproduced data;

error correcting said data blocks to produce error corrected data;

separating system data from said error corrected data; and controlling transfer of said error corrected data to a memory based on said system data such that said dummy data in said error corrected data is not transferred to said memory.

14. The method of claim 13, further comprising:

temporarily storing said error correct ion data prior to transfer to said memory.

15. The method of claim 14, wherein said temporarily storing step stores said error correction data as said data blocks.

16. The method of claim 15, wherein said predetermined size is sixteen sectors of data.

17. The method of claim 13, wherein said system data includes position data.

18. The method of claim 17, wherein said reproducing step reproduces data divided into logical data groups, each logical data group divided into data units, said logical data groups and said data units include position data, said position data for each logical group includes identifiers for first and last data units in said logical data group, and said position data for each data unit includes an identifier.

19. The method of claim 18, wherein said logical data group is a video object unit, and said data unit is a sector.

20. The apparatus of claim 13, wherein said reproducing step reproduces data divided into logical data groups, each logical data group divided into data units, and said logical data groups and said data units include position data;

said forming step, for each logical data group, forms said data blocks of a predetermined number of data units by selectively adding data units of said dummy data to said data units of said reproduced data;

said separating step detects and decodes said position data for a logical data group in said error corrected data; and said controlling step includes, a comparing said position data for each data unit in each data block corresponding to said logical data group to said decoded position data for said logic data group, determining whether each data unit is a dummy data unit based on said comparison, and controlling transfer of each data unit to said memory based on said determination such that said dummy data is not transferred to said memory.

21. The method of claim 20, wherein said position data for said logical group includes identifiers for first and last data units in said logical data group, and said position data for each data unit includes an identifier.

22. The method of claim 21, wherein said logical data group is a video object unit, and said data unit is a sector.

23. The method of claim 20, wherein said logical data group is a video object unit, and said data unit is a sector.

24. The apparatus of claim 13, further comprising:

controlling transfer of said error corrected data stored in said memory to a data decoder.

* * * * *